US006929386B2

(12) United States Patent
Chou

(10) Patent No.: US 6,929,386 B2
(45) Date of Patent: Aug. 16, 2005

(54) CONNECTOR HOUSING WITH INTEGRATED LAMP AND SWITCH

(75) Inventor: Shu-Hsiung Chou, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 16 days.

(21) Appl. No.: 10/756,987

(22) Filed: Jan. 14, 2004

(65) Prior Publication Data

US 2005/0152152 A1 Jul. 14, 2005

(51) Int. Cl.[7] .............................................. F21V 19/02

(52) U.S. Cl. ...................... 362/372; 362/523; 362/519; 362/356; 439/36; 439/947; 315/84

(58) Field of Search ................................ 362/362, 365, 362/372, 472, 490, 493, 512, 523, 545, 519; 439/36, 63, 541.5, 554, 947; 315/77, 84

(56) References Cited

U.S. PATENT DOCUMENTS

| | | | | |
|---|---|---|---|---|
| 4,393,855 A * | 7/1983 | Mandar et al. | ............. | 123/587 |
| 5,050,922 A * | 9/1991 | Falcoff | ...................... | 296/37.7 |
| 5,357,408 A | 10/1994 | Lecznar et al. | | |
| 5,947,588 A * | 9/1999 | Huang | ........................ | 362/235 |
| 6,092,916 A | 7/2000 | Davis et al. | | |
| 6,439,740 B1 | 8/2002 | Yan | | |
| 6,773,151 B2 * | 8/2004 | Brown | ....................... | 362/519 |
| 6,776,621 B1 * | 8/2004 | Dye | ............................ | 439/63 |
| 2002/0186567 A1 | 12/2002 | Brown | | |

* cited by examiner

*Primary Examiner*—Haissa Philogene
(74) *Attorney, Agent, or Firm*—Bill Panagos

(57) ABSTRACT

A lamp with connector housing for motor vehicles comprising a push/push switch, a light source, and a backplate with a 3-way connector. The backplate with a 3-way connector further comprises a connection between point ground and point door and a connection between point ground and point B. This lamp with connector housing is twisted into the motor vehicle headliner with no screws or other fasteners, it has a compact size, and only uses one light source to illuminate the interior of a motor vehicle.

5 Claims, 4 Drawing Sheets

8
18
16
14
22
20
24
26
10
28
12

8
10
12

8
12

8
12
10

8
5
12
10
5

8
10
12

30

CONNECTOR HOUSING WITH INTEGRATED LAMP AND SWITCH

FIELD OF INVENTION

This invention relates to lamps within a motor vehicle. More specifically, it relates to an improved lamp for motor vehicles, in which the lamp is more compact, only uses one light source, twists into the headliner substrate, and utilizes the 3-way connector in one compact body.

BACKGROUND OF THE INVENTION

Lamps are not an uncommon feature in motor vehicles. Consumers enjoy having lamps in their cars for a variety of purposes, namely to find objects in the dark or to be able to read a map/directions while driving in the dark. As a result, car manufacturers have met this demand by providing lamps that a user can activate manually by pushing a button or ones that turn on when the vehicle doors open. However, manufacturers have become more and more competitive with each other to create lamps that have lowered costs, higher quality, and take up less space within the motor vehicle headliner.

Having a twist-in lock to the headliner with no screws, clips, fasteners, etc. is a desired feature. While twist-in lock lamp sockets are known in the art, it is generally not used in motor vehicles. Typically, screws or other fasteners are used to attach lamps to headliners. The U.S. Pat. No. 5,357,408, (Lecznar et al.) relates to an interior lamp for an automotive vehicle, which comprises a lens, an illumination source, and a shield. The lamp in the '408 patent also requires screws/fasteners in installing it into the headliner. Adding these parts during installation raises costs of installation and repair, if repair becomes necessary. U.S. Pat. No. 6,092,916 (Davis et al.) utilizes a snap in feature for a ceiling lamp assembly. However, the '916 does not utilize a 3-way connector and is not as compact as this invention.

This present invention integrates a push/push switch that consumers desire with a 3-way connector in a compact body to meet the demands of the industry. This lamp for a motor vehicle utilizes a twist-in feature and eliminates the use of screws or other fasteners to hold the lamp into the headliner. This lamp also uses only one light source to provide illumination. This invention is an improvement over prior art because it adopts the twist-in lock concept, integrates the push/push switch into a connector body, and utilizes the LED light source, the whole lamp assembly then becomes very compact and light weight, can be easily installed to the headliner of a motor vehicle and is a fully functional light with the motor vehicle door opened or as a push/push lamp while the motor vehicle is in motion.

SUMMARY OF INVENTION

This invention relates to a lamp with connector housing for motor vehicles comprising a push/push switch, a light source, and a backplate with a 3-way connector further comprising a connection between a point ground and a point B as well as a connection between point ground and point door.

In this lamp with connector housing, the light source is attached to the back plate with a 3-way connector. The push/push switch is then connected to the 3-way connector. The resulting lamp with connector housing is then twisted into the headliner of the motor vehicle.

When the car door is opened, this lamp with integrated connector housing in it its standby mode. In its standby mode, the connection within the 3-way connector is occurring between point ground and point door. When the door to the motor vehicle is closed the lamp with connector housing is activated by using the push/push switch. When the push/push switch is pressed, the connection within the 3-way connector is occurring between point ground and point B.

As a result of this invention, the lamp for a motor vehicle is now in a compact body with a 3-way connector. No screws or other fasteners are required to install within headliner. Only one light source is needed to illuminate the desired space of a motor vehicle.

Other features and advantages of this invention will become apparent from the following drawings and the detailed description of the preferred embodiment.

DETAILED DESCRIPTION OF THE DRAWINGS

DETAILED DESCRIPTION OF THE PREFERRED EMBODIMENT

Figure 1:
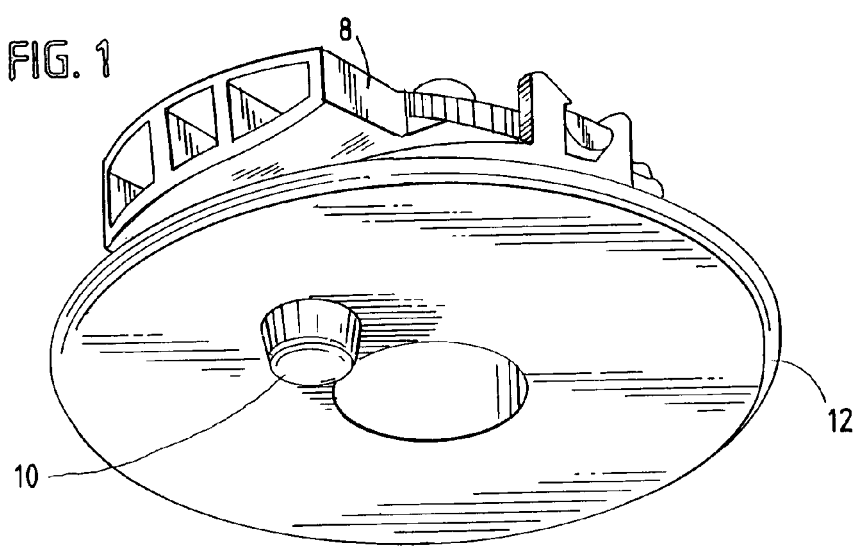
FIG. 1 is a view of this improved lamp with connector housing as one would see from a seat in the motor vehicle.
Figure 2:
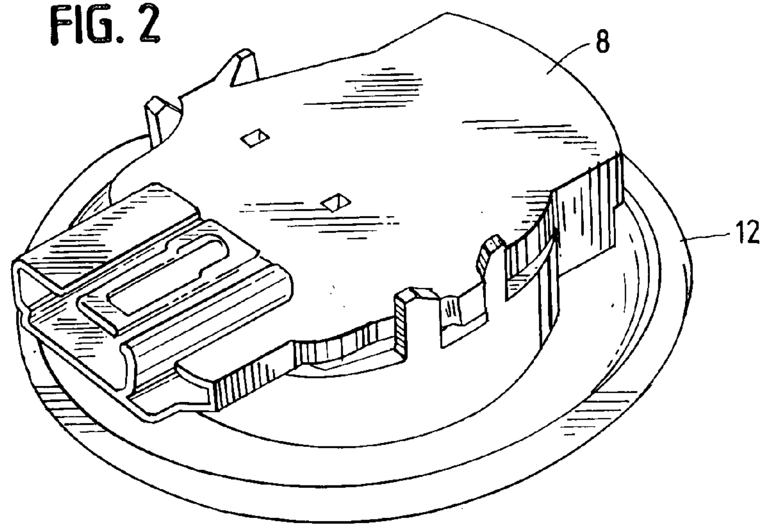
FIG. 2 is a backside view of this improved lamp with connector housing.
Figure 3:
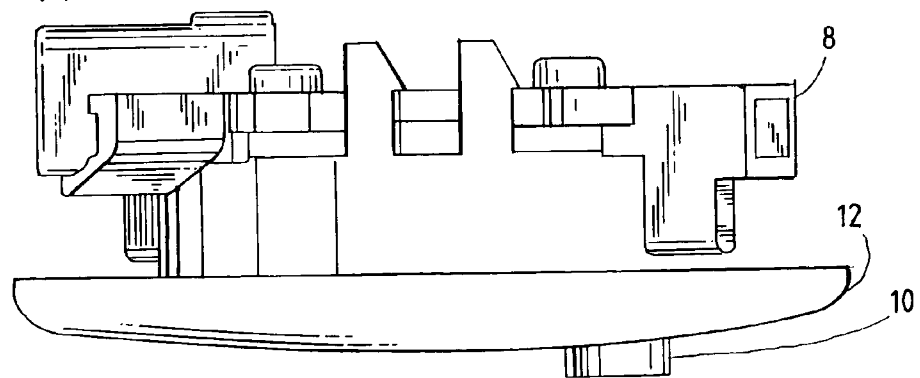
FIG. 3 is a side view of this improved lamp with connector housing.
Figure 4:
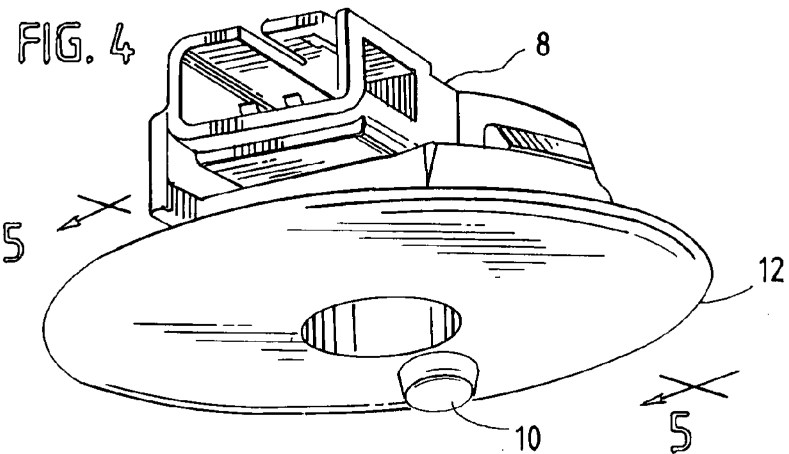
FIG. 4 is a more detailed view of this improved lamp with connector housing.
Figure 5:
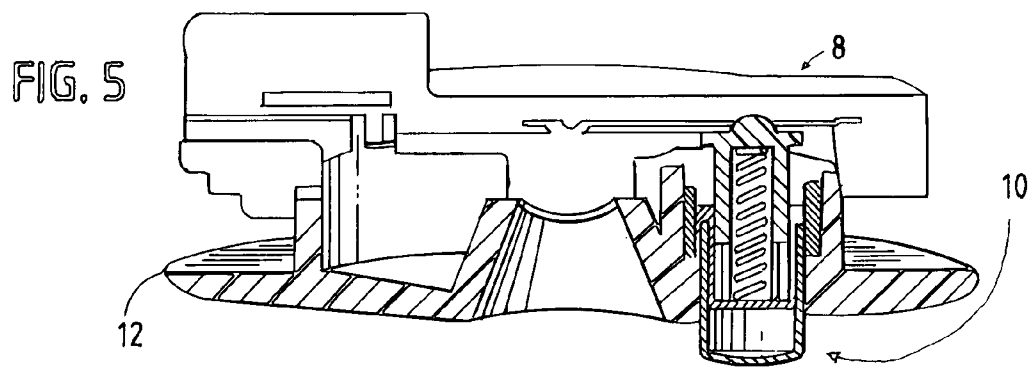
FIG. 5 is a cross-sectional view of this improved lamp with connector housing.
Figure 6:
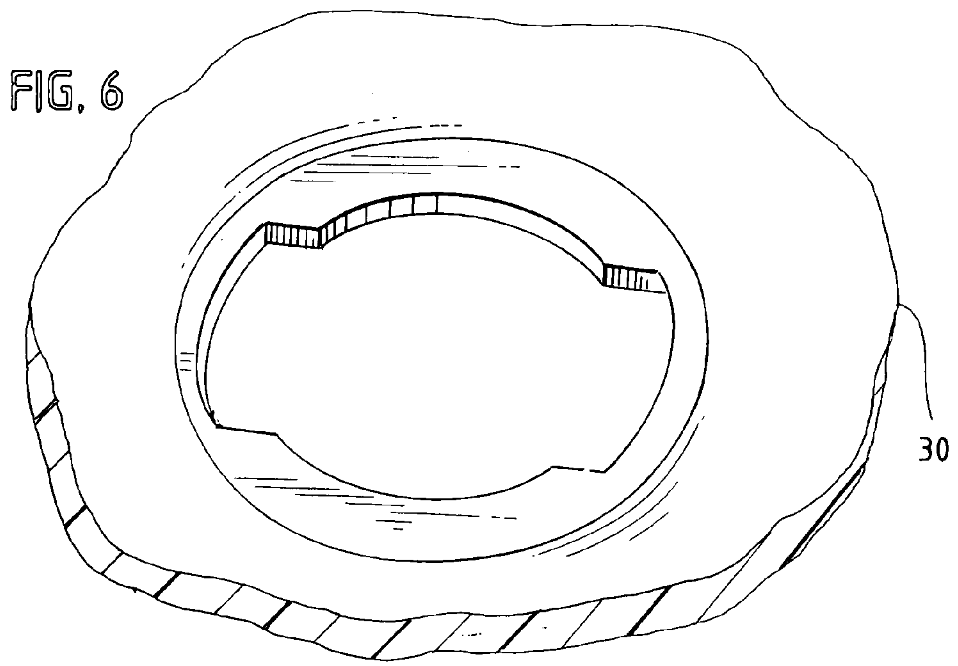
FIG. 6 is a view of the cutout within the headliner.

In its preferred embodiment, this improved lamp with connector housing comprises a backplate with a 3-way connector 8, a push/push switch 10, and a light source 12. This backplate with a 3-way connector 8 further comprises a connection between point ground 16 and point door 14 and a connection between point ground 16 and point B 18.

This lamp with connector housing will be twist locked into the headliner 30 of a motor vehicle. There is no need to attach this lamp to the headliner 30 with screws or other fasteners. Referring to FIGS. 1–5, the backplate with a 3-way connector 8 is connected to a light source 12. A push/push switch 10 is then connected to the light source 12.

Figure 7:
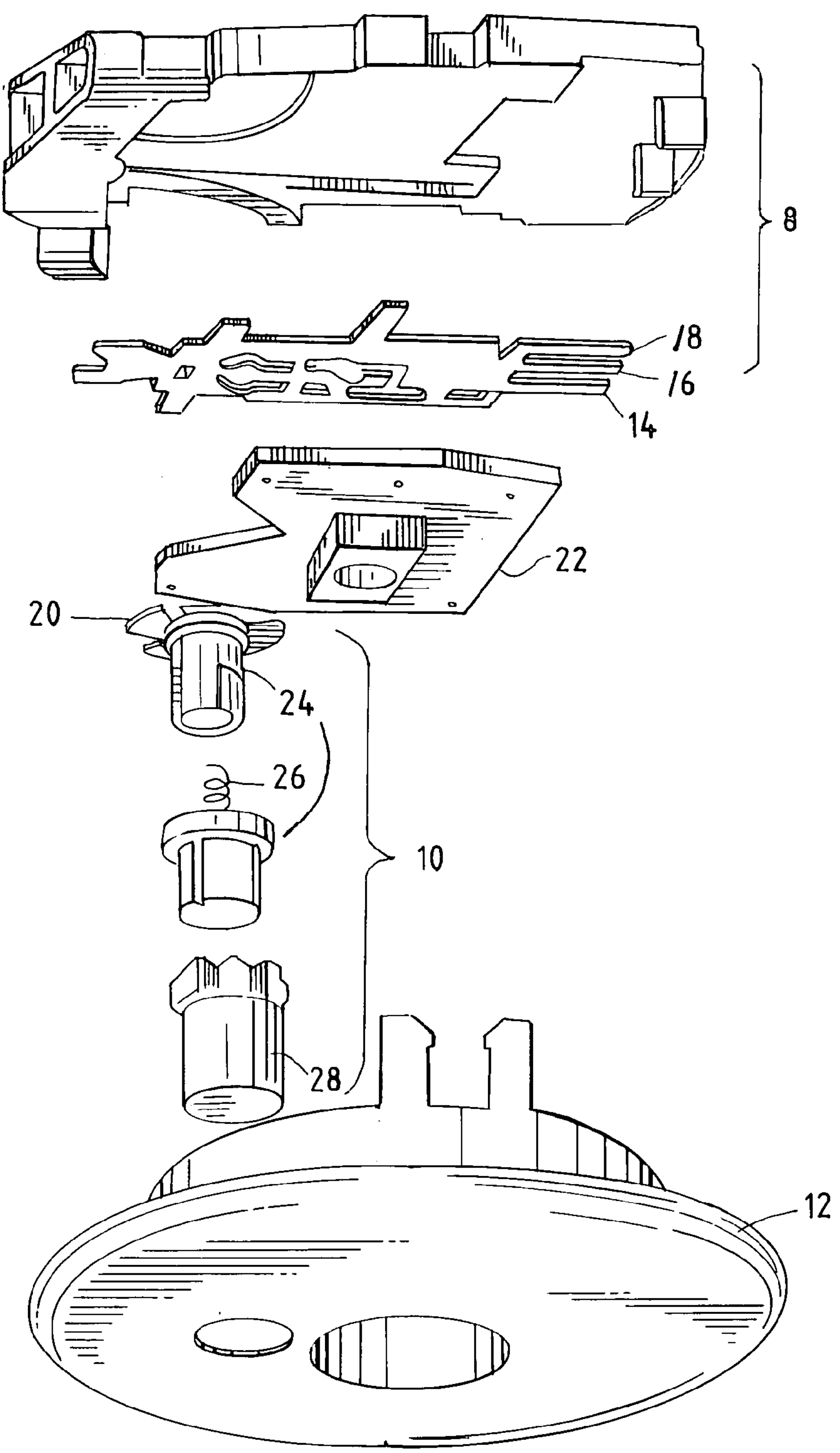
FIG. 7 is an exploded view of this improved lamp with connector housing.
Figure 8:
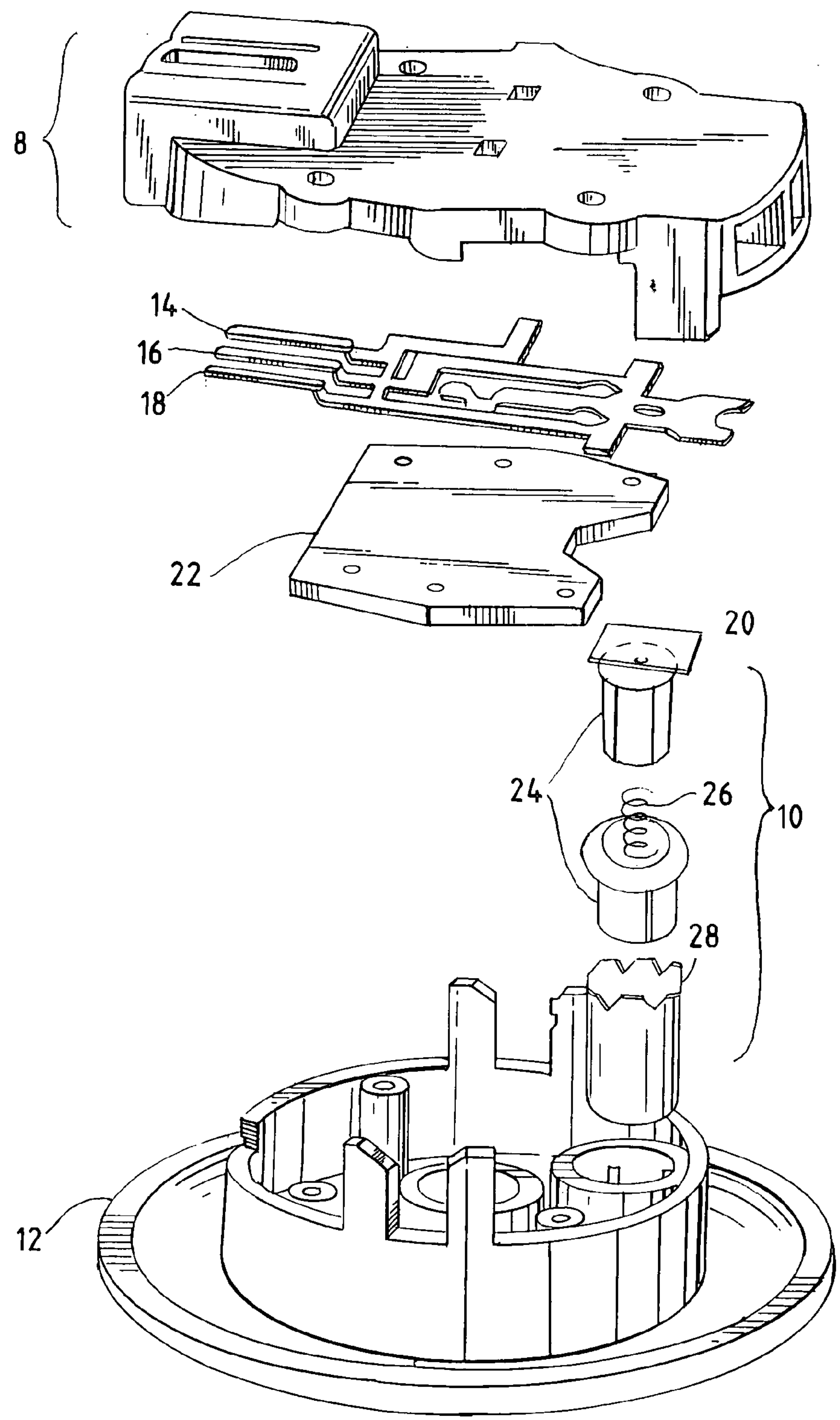
FIG. 8 is an exploded view of this improved lamp with connector housing shown from the reverse view of FIG. 7.

In more detail, as seen in FIG. 7 and FIG. 8, the preferred embodiment will utilize a contact 20 on the backplate with a 3-way connector 8. The light source 12 will be soldered to a board 22 and will fit over the backplate with a 3-way connector 8. The push/push switch 10 further comprises a shaft with plunger 24, a spring 26, and push button 28 will fit through the board 22 with the light source 12 soldered to it. The lens will then fit over the parts to complete the lamp with connector housing.

With the assembly of parts complete, the lamp is ready to function. If the door to the motor vehicle is opened, the lamp with connector housing will be illuminated. With the door open, the lamp with connector housing is utilizing its stand-by mode. In this mode, the connection within the backplate with a 3-way connector 8 is between point ground 16 and point door 14. When the door closes, the lamp with connector housing will go dark.

While the door to the motor vehicle is closed and the lamp with connector housing is in stand by mode, a user can still illuminate the motor vehicle. A user will have to press the push/push switch 10. As this push/push switch 10 is pressed, the shaft with plunger 24 and contact 20 will be rotated to a certain degree, preferably about 45 degrees. This will cause the contact to make a connection between point ground 14 and point B 18. The lamp with connector housing will then be illuminated.

This lamp with connector housing thus makes a very desirable feature for a motor vehicle. Its compact size, its twist-in feature, and a backplate with a built-in 3-way connector 8 make for a lamp with lower costs, lightweight and increased quality.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. An improved lamp with connector housing for motor vehicles comprising:

a push/push switch;

a light source; and a backplate with a 3-way connector housing further comprising a connection between point ground and point door and a connection between point ground and point B.

2. The lamp with connector housing as in claim 1 which can be twisted into the headliner of said motor vehicles.

3. The lamp with connector housing as in claim 1, wherein said light source is connected to said backplate with a 3-way connector and said push/push switch is attached to said light source.

4. The lamp with connector housing as in claim 3, wherein said connection between point ground and point door is in a stand by mode and if door of said motor vehicles is opened, said lamp with connector housing is turned on.

5. The lamp with connector housing as in claim 3, where said connection between point ground and point B is activated by use of said push/push switch.

* * * * *